US011823573B2

(12) United States Patent
Choi

(10) Patent No.: US 11,823,573 B2
(45) Date of Patent: Nov. 21, 2023

(54) SIGNAL CONTROL APPARATUS AND SIGNAL CONTROL METHOD BASED ON REINFORCEMENT LEARNING

(71) Applicant: LAON ROAD INC., Seongnam-si (KR)

(72) Inventor: Tae Wook Choi, Seongnam-si (KR)

(73) Assignee: LAON ROAD INC., Seongnam-si (KR)

(*) Notice: Subject to any disclaimer, the term of this patent is extended or adjusted under 35 U.S.C. 154(b) by 254 days.

(21) Appl. No.: 17/422,984

(22) PCT Filed: Sep. 14, 2020

(86) PCT No.: PCT/KR2020/012363
§ 371 (c)(1),
(2) Date: Jul. 14, 2021

(87) PCT Pub. No.: WO2021/085848
PCT Pub. Date: May 6, 2021

(65) Prior Publication Data
US 2022/0076571 A1 Mar. 10, 2022

(30) Foreign Application Priority Data
Oct. 28, 2019 (KR) .................. 10-2019-0134942

(51) Int. Cl.
G08G 1/08 (2006.01)
G06V 20/54 (2022.01)
G05B 13/02 (2006.01)

(52) U.S. Cl.
CPC ............. G08G 1/08 (2013.01); G05B 13/027 (2013.01); G06V 20/54 (2022.01)

(58) Field of Classification Search
CPC .......... G08G 1/08; G08G 1/145; G08G 1/005; G08G 1/127; G08G 1/082; G08G 1/081; G08G 1/0129; G06V 20/54; G05B 13/027
See application file for complete search history.

(56) References Cited

U.S. PATENT DOCUMENTS 6,317,058 B1 * 11/2001 Lemelson .............. G08G 1/087
340/905
6,633,238 B2 * 10/2003 Lemelson ............ G08G 1/0116
340/905

(Continued)

FOREIGN PATENT DOCUMENTS

CN 109472984 A 3/2019
CN 110032782 A 7/2019

(Continued)

Primary Examiner — Hoi C Lau
(74) Attorney, Agent, or Firm — Sughrue Mion, PLLC

(57) ABSTRACT

Proposed herein are a signal control apparatus and method based on reinforcement learning. The signal control apparatus includes: a photographing unit configured to acquire an intersection image by capturing an image of an intersection; a control unit configured to calculate the congestion level information of the intersection by analyzing the intersection image acquired by the photographing unit, and to calculate control information for a subsequent signal by using a reinforcement learning model, trained by using state information calculated based on the congestion level of the intersection and reward information as input values, and the congestion level information; and a drive unit configured to drive traffic lights according to the control information for a subsequent signal calculated by the control unit.

15 Claims, 10 Drawing Sheets

(56) References Cited

U.S. PATENT DOCUMENTS

| | | | |
|---|---|---|---|
| 8,928,493 B2* | 1/2015 | Mantalvanos | G08G 1/081 340/905 |
| 9,076,332 B2* | 7/2015 | Myr | G08G 1/04 |
| 9,972,199 B1* | 5/2018 | Liu | G08G 1/005 |
| 10,002,530 B1* | 6/2018 | Liu | G08G 1/0129 |
| 10,242,568 B2* | 3/2019 | Liu | G06N 20/00 |
| 10,395,529 B2* | 8/2019 | Liu | G08G 1/005 |
| 10,490,066 B2* | 11/2019 | Green | G08G 1/081 |
| 10,573,178 B2* | 2/2020 | Nascimento | H04L 67/12 |
| 10,902,719 B2* | 1/2021 | Baik | G06V 20/54 |
| 11,069,233 B1* | 7/2021 | Gao | G08G 1/0116 |
| 11,080,602 B1* | 8/2021 | Oroojlooyjadid | G06N 3/045 |
| 2002/0008637 A1* | 1/2002 | Lemelson | G08G 1/07 340/907 |
| 2008/0094250 A1* | 4/2008 | Myr | G08G 1/081 340/909 |
| 2013/0099942 A1* | 4/2013 | Mantalvanos | G08G 1/082 340/910 |
| 2018/0122237 A1* | 5/2018 | Nascimento | G08G 1/127 |
| 2018/0190111 A1* | 7/2018 | Green | G08G 1/0133 |
| 2018/0261085 A1* | 9/2018 | Liu | G08G 1/08 |
| 2019/0139405 A1* | 5/2019 | Liu | G08G 1/08 |
| 2019/0258938 A1 | 8/2019 | Mnih et al. | |
| 2020/0134325 A1* | 4/2020 | Sun | G08G 1/0112 |
| 2020/0135018 A1* | 4/2020 | Baik | G08G 1/0145 |
| 2020/0334979 A1* | 10/2020 | Gonçalves | G08G 1/0129 |
| 2021/0055122 A1* | 2/2021 | Pham | G08G 1/0145 |
| 2021/0065541 A1* | 3/2021 | Koshizen | G08G 1/0133 |
| 2021/0118288 A1* | 4/2021 | Kalabic | G08G 1/08 |
| 2021/0201672 A1* | 7/2021 | Gao | G08G 1/0145 |
| 2022/0076571 A1* | 3/2022 | Choi | G08G 1/0145 |
| 2022/0270480 A1* | 8/2022 | Lee | G06N 3/088 |
| 2023/0180045 A1* | 6/2023 | Chan | G05D 1/0088 701/31.4 |

FOREIGN PATENT DOCUMENTS

| | | |
|---|---|---|
| CN | 110114806 A | 8/2019 |
| KR | 10-2009-0116172 A | 11/2009 |
| KR | 10-2011-0136182 A | 12/2011 |
| KR | 10-2017-0074076 A | 6/2017 |
| KR | 10-1821494 B1 | 1/2018 |
| KR | 10-1837256 B1 | 3/2018 |
| KR | 10-1942491 B1 | 1/2019 |
| KR | 10-2019-0080818 A | 7/2019 |
| KR | 10-2002-0092107 A | 8/2019 |
| KR | 10-2021534 B1 | 9/2019 |
| KR | 10-2021992 B1 | 9/2019 |

* cited by examiner

[Fig. 1]
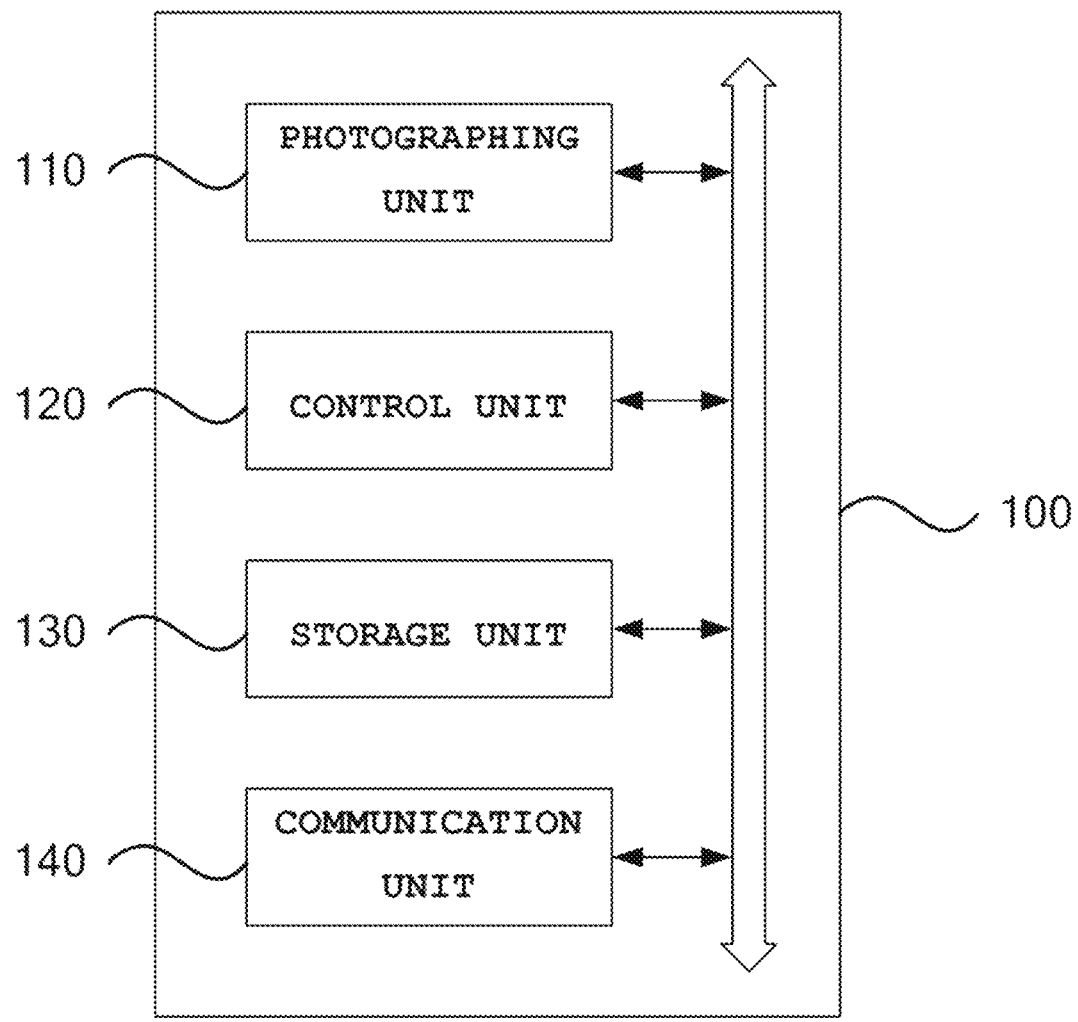

[Fig. 2]
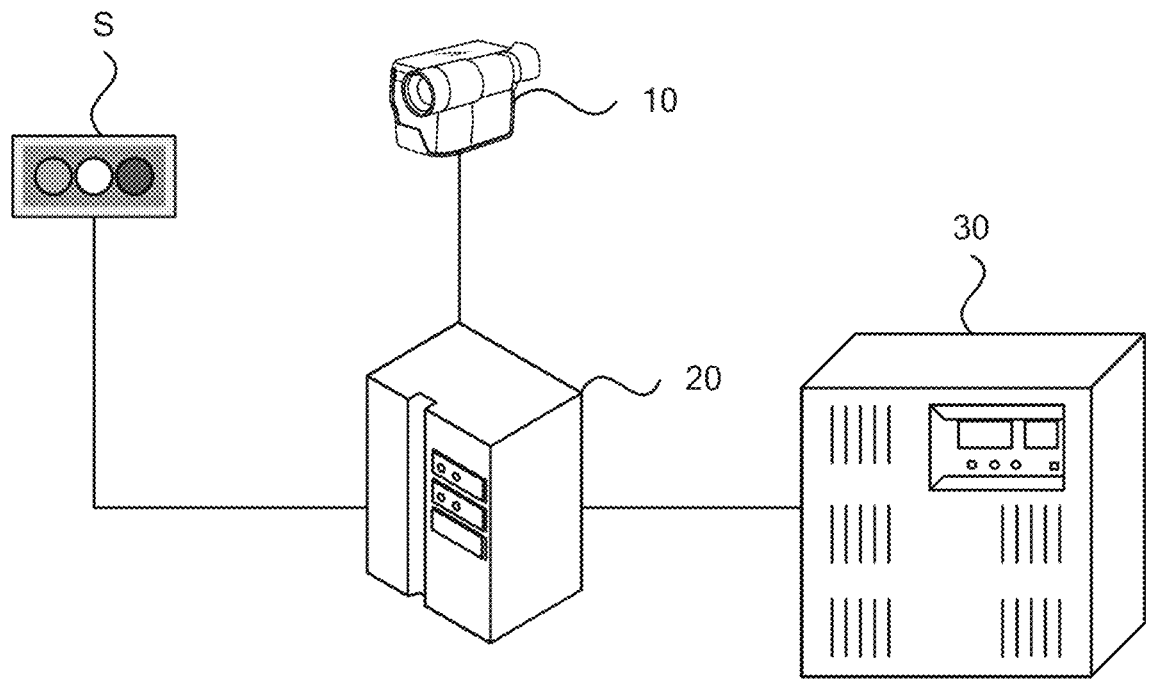

[Fig. 3]
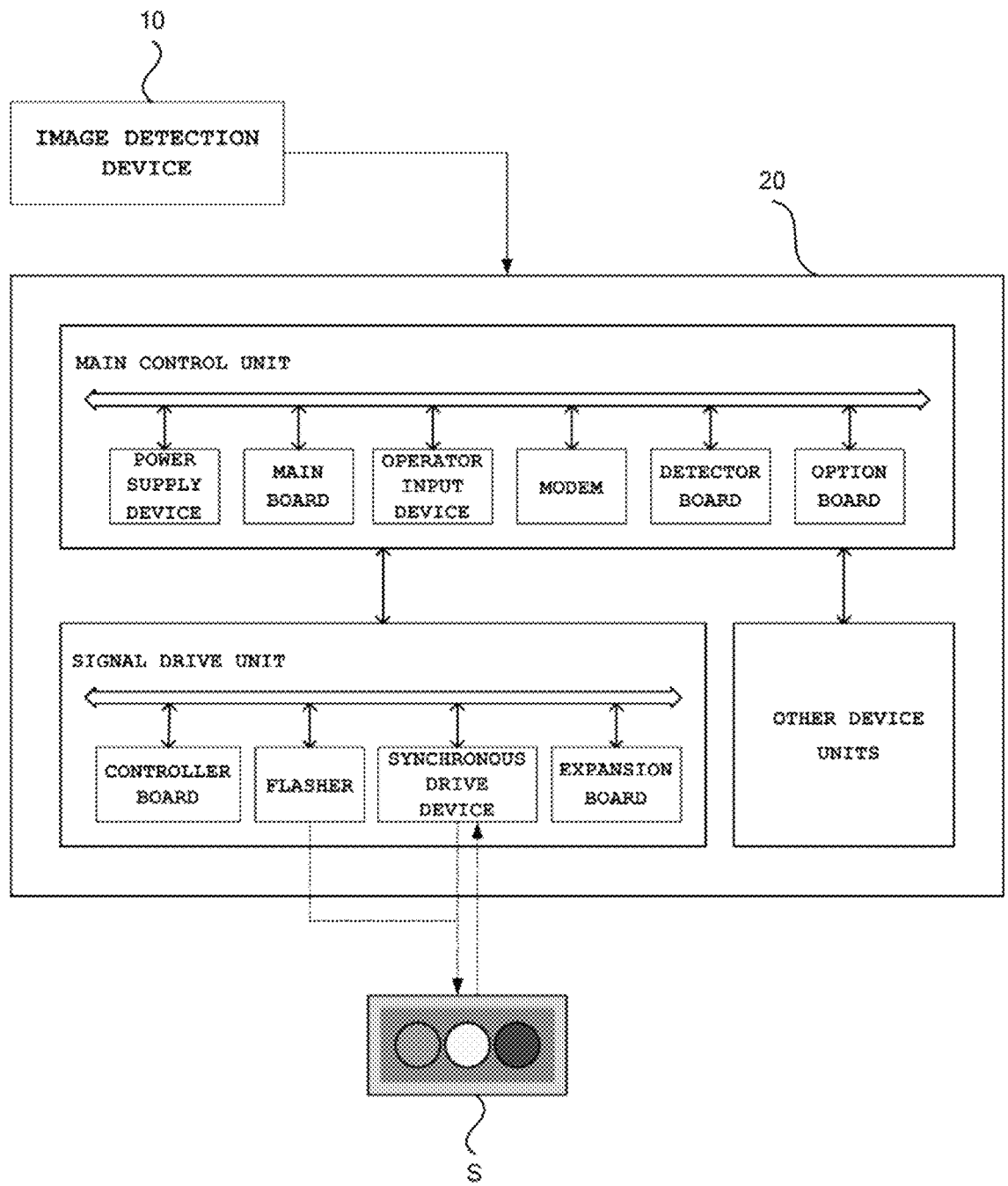

[Fig. 4]
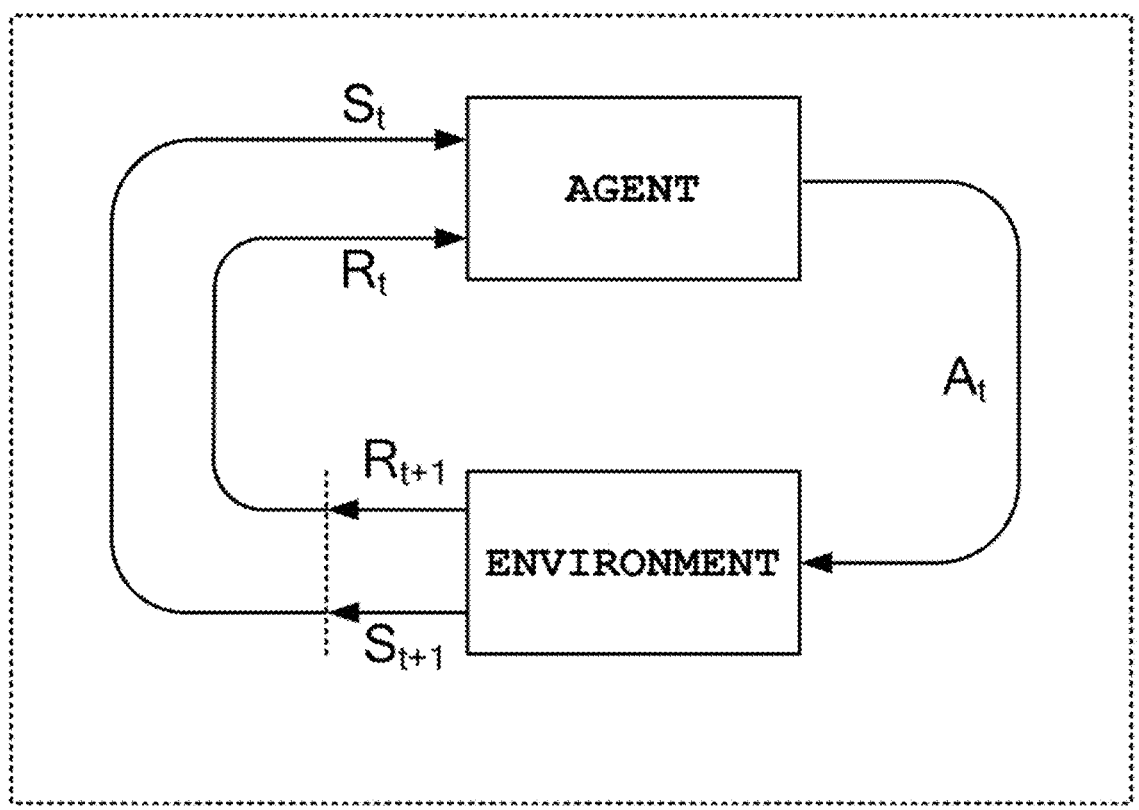

[Fig. 5]
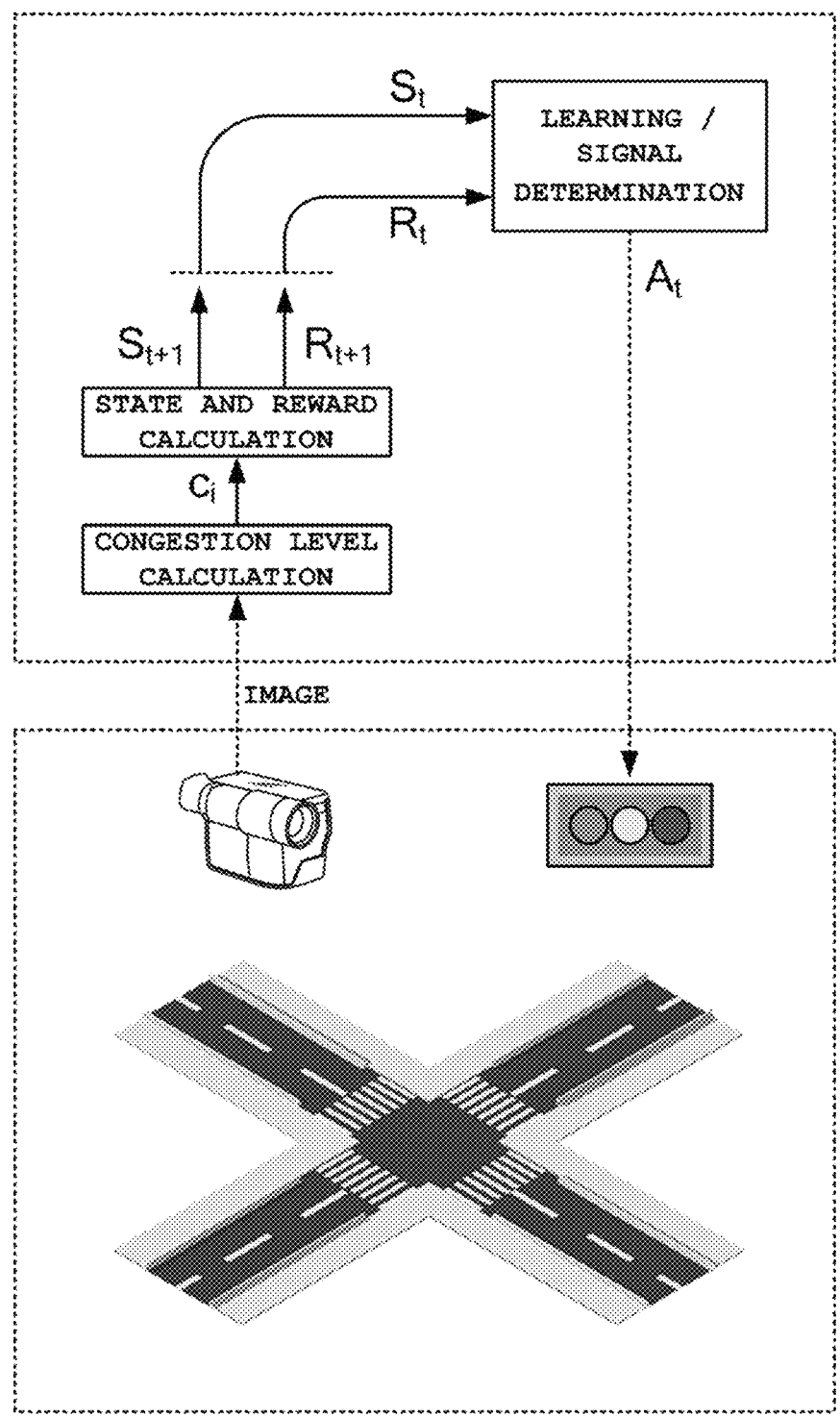

[Fig. 6]

| VARIABLE | VALUE |
|---|---|
| MAXIMUM VEHICLE SPEED | 15m/s |
| ACCELERATION PERFORMANCE | 2.5m/s$^2$ |
| DECELERATION PERFORMANCE | 4.25m/s$^2$ |
| LANE LENGTH | 120 METERS |
| VEHICLE LENGTH | 4.5 METERS |
| MINIMUM GAP BETWEEN VEHICLES | 2 METERS |
| VEHICLE FOLLOWING MODEL | Krauss FOLLOWING MODEL |
| YELLOW SIGNAL LENGTH | 2 SECONDS |
| SIGNAL PHASE TIME RANGE | 12 SECONDS |

| SIGNAL PATTERN | DIRECTION | REACH RATE (THE NUMBER OF VEHICLES PER SECOND) | | |
|---|---|---|---|---|
| | | THROUGH MOVEMENT | LEFT TURN | RIGHT TURN |
| P1 | N-S | 0.05 | 0.025 | 0.01 |
| | S-N | 0.05 | 0.025 | 0.01 |
| | E-W | 0.1 | 0.05 | 0.01 |
| | W-E | 0.1 | 0.05 | 0.01 |
| P2 | N-S | 0.05 | 0.025 | 0.01 |
| | S-N | 0.05 | 0.025 | 0.01 |
| | E-W | 0.05 | 0.1 | 0.01 |
| | W-E | 0.05 | 0.1 | 0.01 |
| P3 | N-S | 0.1 | 0.08 | 0.01 |
| | S-N | 0.05 | 0.025 | 0.01 |
| | E-W | 0.1 | 0.08 | 0.01 |
| | W-E | 0.05 | 0.025 | 0.01 |
| P4 | N-S | 0.05 | 0.025 | 0.01 |
| | S-N | 0.05 | 0.025 | 0.01 |
| | E-W | 0.05 (0-1200) 0.15 (1200-1800) | 0.025 | 0.01 |
| | W-E | 0.15 (0-600) 0.05 (600-1800) | 0.025 | 0.01 |

P1: A CASE WHERE THE TRAFFIC IN THE E-W DIRECTION IS DIFFERENT FROM THE TRAFFIC IN THE S-N DIRECTION
P2: A CASE WHERE THE THROUGH TRAFFIC AND THE LEFT-TURN TRAFFIC ARE DIFFERENT FROM EACH OTHER
P3: A CASE WHERE THE TRAFFIC IN THE N-E DIRECTION IS DIFFERENT FROM THE TRAFFIC IN THE S-W DIRECTION
P4: A CASE WHERE TRAFFIC PATTERNS CHANGE DYNAMICALLY OVER TIME

[Fig. 7]
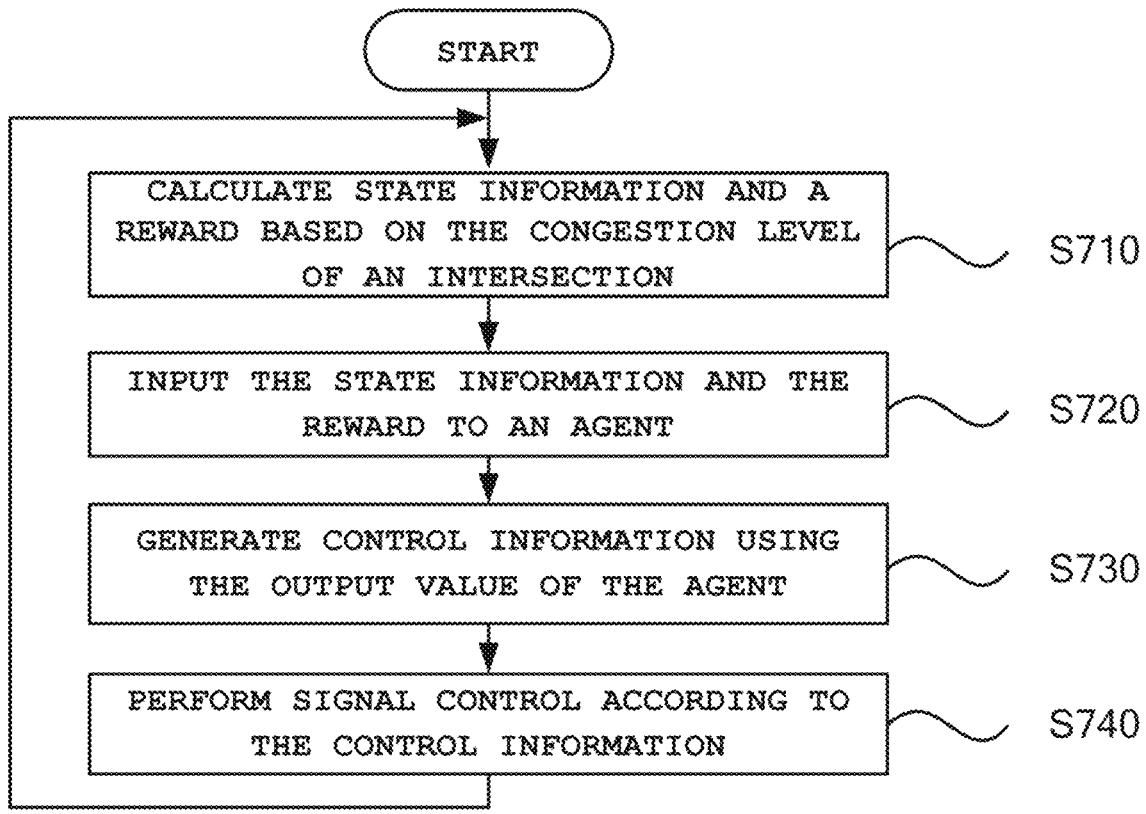

[Fig. 8]
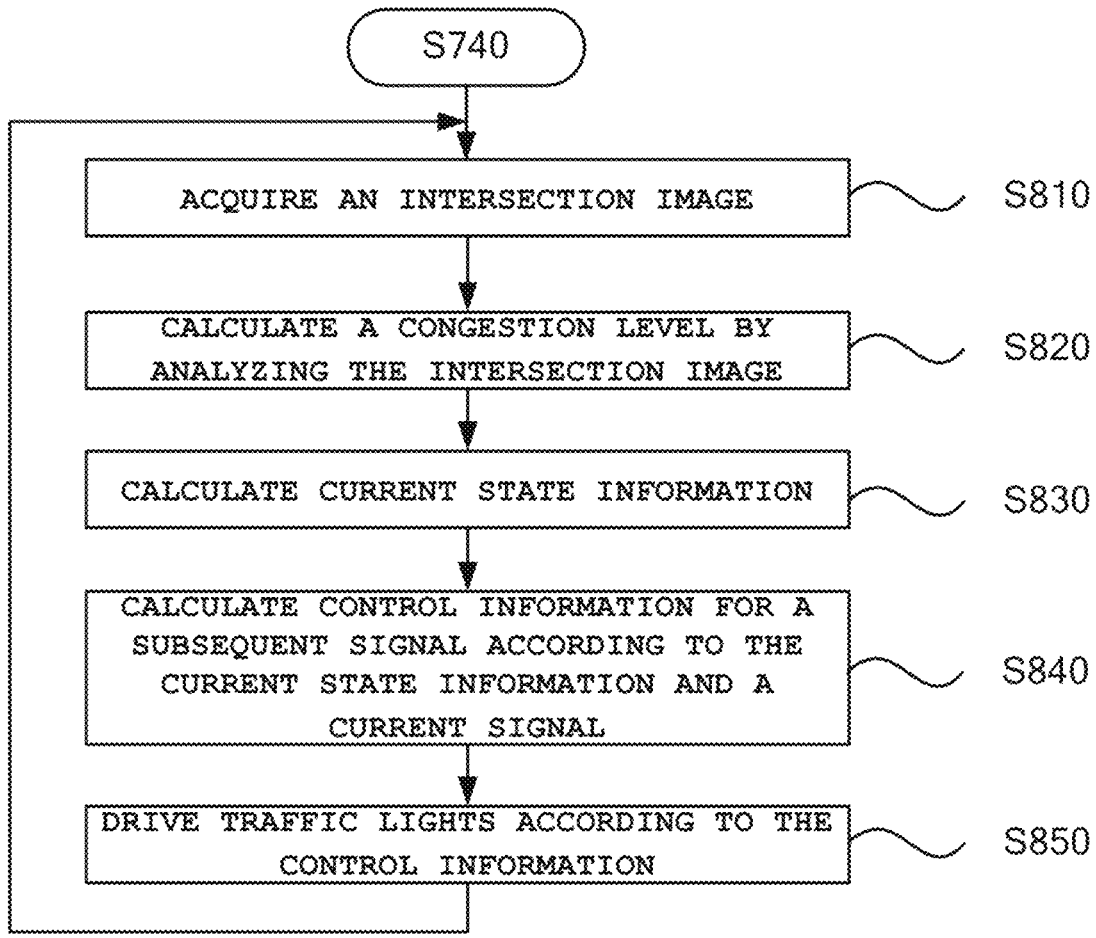

[Fig. 9]
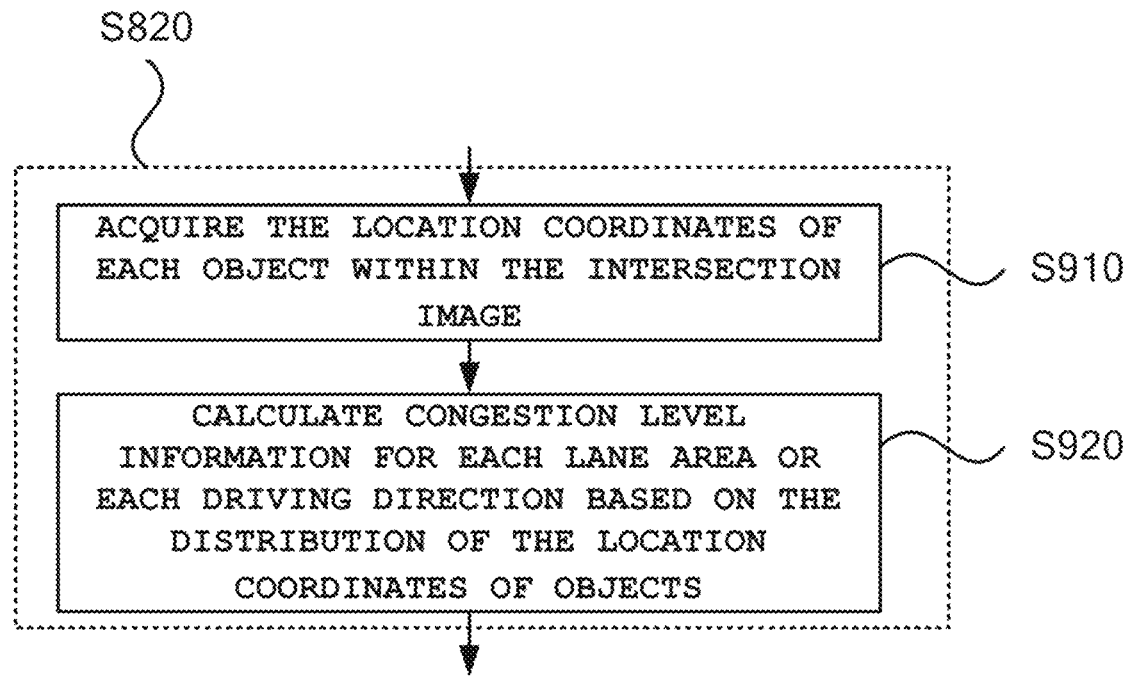

[Fig. 10]
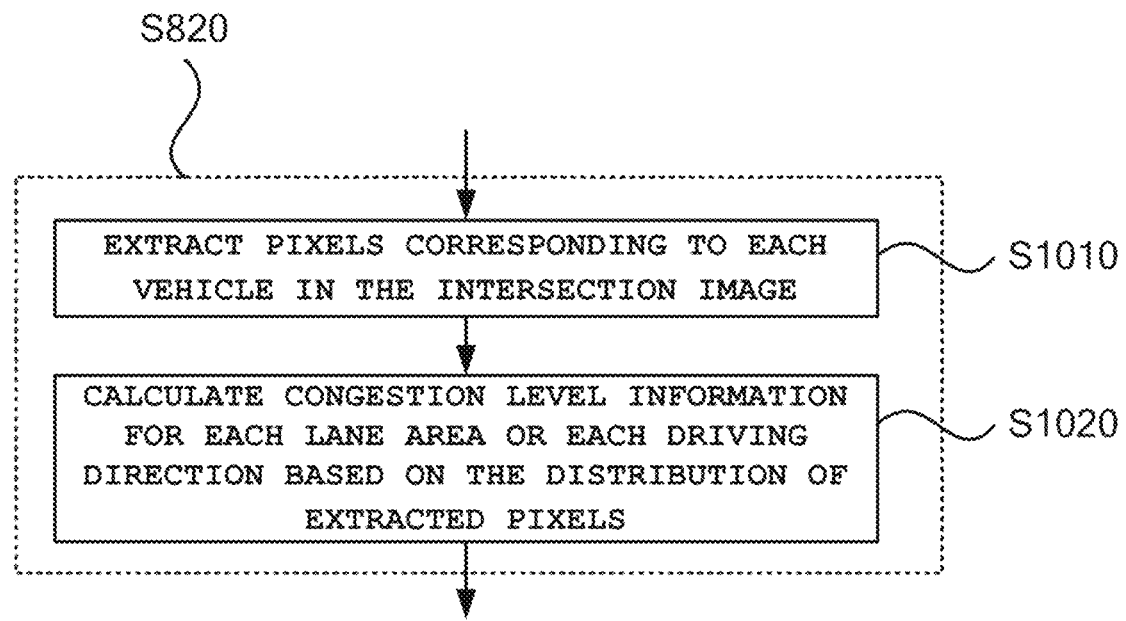

SIGNAL CONTROL APPARATUS AND SIGNAL CONTROL METHOD BASED ON REINFORCEMENT LEARNING

TECHNICAL FIELD

The embodiments disclosed herein relate to a signal control apparatus and method based on reinforcement learning, and more particularly to a signal control apparatus and method based on reinforcement learning that control traffic signals at an intersection by using a reinforcement learning network that is trained such that the congestion level of the intersection can be mitigated.

BACKGROUND ART

Traffic lights are essential to the maintenance of order on roads, but there are many cases where traffic jams are caused by traffic lights. In particular, when the duration of a signal for the movement direction of a heavily congested lane is short, roads for movement in the other directions tend to be also congested.

Accordingly, in recent years, there are an increasing number of intersections at which actuated traffic lights that are controlled using a method of taking into consideration real-time traffic, such as a method of increasing signal duration for a heavily congested direction and reducing signal duration for the remaining directions, are installed.

In particular, at an independent intersection the traffic signals of which are not controlled in association with those of another intersection, intersection signals are controlled independently according to the current state of the intersection. In this case, there is formed an independent environment that is suitable for determining the state of the corresponding intersection using loop detectors or an image detector and controlling traffic signals according to the current state of the intersection.

However, in such an environment, determining an appropriate subsequent signal based on the state of an intersection according to a current signal is a difficult issue to be performed using a general supervised or unsupervised learning model. Since the number of combinations of data based on the complex and diverse environments and traffic signal systems of intersections is significantly large, an excessively large amount of training data is needed to produce meaningful learning results. Furthermore, when given environments and current signals are taken into consideration, it is almost impossible to determine whether or not a specific signal is suitable as a subsequent signal. Accordingly, it is difficult to use the conventional supervised or unsupervised learning model for intersection signal control.

Korean Patent Application Publication No. 10-2009-0116172 entitled 'Artificial Intelligence Vehicle Traffic Light Control Apparatus' describes a method of analyzing an image captured using an image detector and controlling traffic lights. However, the above-described conventional art has a problem in that it is difficult to achieve the efficiency of a traffic signal system because an artificial intelligence model is only used as a means for detecting the presence of a vehicle in a specific lane by simply analyzing an image, but determining a subsequent signal based on the detected information is performed by a conventional simple operation.

As described above, conventionally, there has not been proposed a method for mitigating all the congestion levels of lanes within an intersection by applying a machine learning model not only to image analysis but also to an operation for determining a specific phase signal itself.

Therefore, there is a need for a technology for overcoming the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

An object of the embodiments disclosed herein is to propose a signal control apparatus and method based on reinforcement learning.

An object of the embodiments disclosed herein is to propose a signal control apparatus and method based on reinforcement learning that can improve overall signal efficiency by using a machine learning model not only for the detection of the state of an intersection but also for the specific operation of controlling a subsequent signal according to the current state of the intersection.

An object of the embodiments disclosed herein is to propose a signal control apparatus and method based on reinforcement learning that enable efficient learning and signal control based on the learning by using a reinforcement learning model based on congestion levels for the signal control of an independent intersection.

Technical Solution

As a technical solution for accomplishing the above objects, according to an embodiment, there is provided a signal control apparatus for controlling traffic signals based on reinforcement learning, the signal control apparatus including: a photographing unit configured to acquire an intersection image by capturing an image of an intersection; a control unit configured to calculate the congestion level information of the intersection by analyzing the intersection image acquired by the photographing unit, and to calculate control information for a subsequent signal by using a reinforcement learning model, trained by using state information calculated based on the congestion level of the intersection and reward information as input values, and the congestion level information; and a drive unit configured to drive traffic lights according to the control information for a subsequent signal calculated by the control unit.

According to another embodiment, there is provided a signal control method that is performed by a signal control apparatus, the signal control method including: training a reinforcement learning model based on the congestion levels of virtual or actual learning target intersections; acquiring an intersection image by capturing a control target intersection; calculating congestion level information for each lane area or each driving direction by analyzing the intersection image; calculating the current state information of the control target intersection based on the congestion level information; calculating control information for a subsequent signal according to the current state information and a current signal by using the reinforcement learning model; and driving traffic lights at the control target intersection according to the calculated control information.

According to still another embodiment, there is provided a computer-readable storage medium having stored thereon a program for performing a signal control method, wherein the signal control method includes: training a reinforcement learning model based on the congestion levels of virtual or actual learning target intersections; acquiring an intersection image by capturing a control target intersection; calculating congestion level information for each lane area or each driving direction by analyzing the intersection image; calculating the current state information of the control target intersection based on the congestion level information; calculating control information for a subsequent signal according to the current state information and a current signal by using the reinforcement learning model; and driving traffic lights at the control target intersection according to the calculated control information.

According to a further embodiment, there is provided a computer program that is executed by a signal control apparatus and stored in a medium in order to perform a signal control method, wherein the signal control method includes: training a reinforcement learning model based on the congestion levels of virtual or actual learning target intersections; acquiring an intersection image by capturing a control target intersection; calculating congestion level information for each lane area or each driving direction by analyzing the intersection image; calculating the current state information of the control target intersection based on the congestion level information; calculating control information for a subsequent signal according to the current state information and a current signal by using the reinforcement learning model; and driving traffic lights at the control target intersection according to the calculated control information.

Advantageous Effects

According to any one of the above-described technical solutions, there may be proposed the signal control apparatus and method based on reinforcement learning.

The embodiments disclosed herein may propose the signal control apparatus and method based on reinforcement learning.

The embodiments disclosed herein may propose the signal control apparatus and method based on reinforcement learning that can improve overall signal efficiency by using a machine learning model not only for the detection of the state of an intersection but also for the specific operation of controlling a subsequent signal according to the current state of the intersection.

The embodiments disclosed herein may propose the signal control apparatus and method based on reinforcement learning that enable efficient learning and signal control based on the learning by using a reinforcement learning model based on a congestion level for the signal control of an independent intersection.

The effects that can be obtained by the embodiments disclosed herein are not limited to the above-described effects, and other effects that have not been described above will be clearly understood by those having ordinary skill in the art, to which the present invention pertains, from the following description.

DESCRIPTION OF DRAWINGS

FIG. 1 is a block diagram showing a signal control apparatus according to an embodiment;

FIGS. 2 and 3 are diagrams showing the schematic configuration of a system including the signal control apparatus according to an embodiment;

FIG. 4 is a diagram showing a general reinforcement learning model;

FIG. 5 is a diagram illustrating the reinforcement learning and signal control process of a signal control apparatus according to an embodiment;

FIG. 6 is a diagram illustrating training data for a signal control apparatus according to an embodiment;

FIG. 7 is a flowchart showing the process of performing reinforcement learning in a signal control method according to an embodiment in a stepwise manner;

FIG. 8 is a flowchart showing the process of controlling traffic lights using a reinforcement learning model in a signal control method according to an embodiment in a stepwise manner; and FIGS. 9 and 10 are flowcharts showing the process of calculating a congestion level in a signal control method according to an embodiment in a stepwise manner.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is 'directly connected' to the other component but also a case where the one component is 'connected to the other component with a third component arranged therebetween'. Furthermore, when one portion is described as "including" one component, this does not mean that the portion does not exclude another component but means that the portion may further include another component, unless explicitly described to the contrary.

The embodiments will be described in detail below with reference to the accompanying drawings.

FIG. 1 is a block diagram showing the configuration of a signal control apparatus 100 according to an embodiment, and FIGS. 2 and 3 are diagrams showing the schematic configuration of a signal control system including the signal control apparatus 100 according to an embodiment.

The signal control apparatus 100 is an apparatus that is installed at an intersection and captures and analyzes an image such as an image of an entry into the intersection or an image of an exit from the intersection. In the following description, an image captured by the signal control apparatus 100 installed at an intersection is referred to as an 'intersection image'.

As shown in FIG. 1, the signal control apparatus 100 includes a photographing unit 110 configured to capture an intersection image, and a control unit 120 configured to analyze the intersection image.

The photographing unit 110 may include a camera configured to capture an intersection image. The photographing unit 110 may include a camera capable of capturing images of wavelengths within a predetermined range, such as that of visible light or infrared light. Accordingly, the photographing unit 110 may acquire an intersection image by capturing an image of a different wavelength region depending on the daytime, the nighttime, or a current situation. In this case, the photographing unit 110 may acquire an intersection image at a preset period.

In addition, the control unit 120 generates 'congestion level information' by analyzing an intersection image acquired by the photographing unit 110. In this case, the control unit 120 may process the intersection image to be analyzed, and may identify an object or pixels corresponding to each vehicle in the processed intersection image. Furthermore, for this purpose, the control unit 120 may identify an object corresponding to each vehicle in the intersection image or whether each pixel is a location corresponding to a vehicle by using an artificial neural network.

In this case, the signal control apparatus 100 may include two or more hardware devices so that the photographing unit 110 configured to capture an intersection image and the control unit 120 configured to analyze the intersection image captured by the photographing unit 110 communicate with each other and are physically spaced apart from each other. In other words, the signal control apparatus 100 may be configured such that the capturing and analysis of an intersection image are separately performed by hardware devices spaced apart from each other. In this case, the hardware device including the configuration of the control unit 120 may receive intersection images from a plurality of different photographing units 110, respectively, and may analyze the intersection images acquired by the plurality of respective photographing units 110.

Furthermore, the control unit 120 may generate a control signal for the intersection based on congestion level information obtained by analyzing the intersection image. In this case, the control unit 120 may calculate a subsequent signal corresponding to the current signal and current state of the intersection by using a reinforcement learning model. To this end, the reinforcement learning model may be trained in advance.

Furthermore, the signal control apparatus 100 may include a storage unit 130. The storage unit 130 may store a program, data, a file, an operating system, etc. required for the capturing or analysis of an intersection image, and may at least temporarily store an intersection image or the results of the analysis of an intersection image. The control unit 120 may access and use the data stored in the storage unit 130, or may store new data in the storage unit 130. Furthermore, the control unit 120 may execute a program installed in the storage unit 130.

Furthermore, the signal control apparatus 100 may include a drive unit 140. The drive unit 140 applies a drive signal to traffic lights S, so that the signal lights S installed at an intersection are driven according to a control signal calculated by the control unit 120.

As described above, the photographing unit 110 of the signal control apparatus 100 is installed at the intersection. Depending on an installation height or location, only one photographing unit 110 is provided at one intersection, or a number of photographing units 110 equal to the number of entries/exits at an intersection may be provided. For example, in the case of a four-way intersection, the signal control apparatus 100 may include four photographing units 110 configured to acquire images of the intersection by capturing four entries/exits separately.

The signal control apparatus 100 may be configured to include one or more hardware components, or may be configured as a combination of hardware components included in a signal control system to be described later.

More specifically, the signal control apparatus 100 may be formed as at least a part of the signal control system, as shown in FIGS. 2 and 3. In this case, the signal control system may include an image detection device 10 configured to capture the above-described intersection image, a traffic signal controller 20 connected to the traffic lights S and configured to apply a drive signal, and a central center 30 configured to control traffic signals while remotely communicating with the traffic signal controller 20.

In this case, the traffic signal controller 20 may be configured to include a main control unit, a signal drive unit, and other device units, as shown in FIG. 3. In this case, the main control unit may be configured such that a power supply device, a main board, an operator input device, a modem, a detector board, and an option board are connected to a single bus. The signal drive unit may be configured to include a controller board, a flasher, a synchronous drive device, and an expansion board. In addition, the other device units configured to control other devices such as an image capturing device configured to detect whether a traffic signal is violated may be provided.

The signal drive unit of the traffic signal controller 20 may receive a control signal from the main board, may generate a drive signal for traffic lights according to the control signal, and may apply the generated drive signal to the traffic lights.

In addition, the central center 30 may centrally control a plurality of traffic signal controllers 20 at a plurality of intersections so that they can be controlled in association with each other, or may allow each of the traffic signal controllers 20 to be locally controlled according to the situation of a corresponding one of the intersections. The central center 30 may control the situations of the respective intersections for the purpose of reference when selecting an appropriate control method or generating a specific control signal, and may directly receive an intersection image captured by the image detection device 10 or receive congestion level information generated by the signal control apparatus 100. The congestion level information will be described later.

The signal control apparatus 100 may be configured to form at least a part of the above-described signal control system, or may be the above-described signal control system itself.

For example, the control unit 120 of the signal control apparatus 100 may be provided in the central center 30, the photographing unit 110 may be constructed in the image detection device 10, and the drive unit 140 may be constructed in the traffic signal controller 20.

The operation of the control unit 120 of the signal control apparatus 100 will be described in more detail below. The control unit 120 may calculate the congestion level information of the intersection by analyzing the intersection image acquired by the photographing unit 110.

To this end, the control unit 120 may acquire the location coordinates of each object using an artificial neural network that receives an intersection image as an input, recognizes an object included in the intersection image and estimated to be a vehicle, and outputs information on the location of the recognized object, and may calculate congestion level information for each lane area or each driving direction.

More specifically, settings may be made such that the input value of the artificial neural network used by the control unit 120 is an intersection image and the output value thereof includes the location information of an object estimated to be a vehicle and the size information of the object.

In this case, the location information of the object is the coordinates (x, y) of the center point P of the object, the size information is information about the width and height (w, h) of the object, and the output value of the artificial neural network may be calculated in the form of (x, y, w, h) for the object O. The control unit 120 may acquire the coordinates (x, y) of the center point P of each vehicle image as two-dimensional coordinates from the output value. Accordingly, it may be possible to calculate the distribution of objects in each preset lane area or each lane area for each driving direction. Thereafter, the control unit 120 may calculate a congestion level according to the distribution of the center points of objects in the lane area or the lane area for each driving direction.

In this case, the congestion level is information calculated by digitizing the degree of congestion for each lane area or each driving direction, and may be calculated to correspond to the number of center points included in each area. For example, when a total of 30 center points are distributed in a left-turn lane in a southwest direction, a congestion level a corresponding driving direction is set to 100. Then, according to the distribution of center points calculated by the artificial neural network, there may be assigned a congestion level having a numerical value in the range of 0 to 100. In other words, when the congestion level is set to 100 in the case where a vehicle in each lane area or each driving direction reaches a saturation level and is set to 0 in the case where there are no vehicle in each lane area or each driving direction, each of other states may be set to a value between 0 and 100 depending on the number of objects or the number of pixels.

In this case, the control unit 120 may use preset information about a lane area or a lane area for each driving direction. Such a lane area may be recognized by the control unit 120 in an intersection image, or may be preset to a specific area in an intersection image when the photographing angle of the photographing unit 110 is not changed.

In this case, an available artificial neural network may be, for example, YOLO, SSD, Faster R-CNN, Pelee, or the like, and such an artificial neural network may be trained to recognize an object corresponding to a vehicle in an intersection image.

Furthermore, as another example, the control unit 120 may acquire the congestion level information of an intersection by using an artificial neural network that performs segmentation analysis. The control unit 120 may extract pixels corresponding to a vehicle by using an artificial neural network that receives an intersection image as an input and outputs a probability map indicating a probability that each pixel included in the intersection image corresponds to a vehicle, may convert the extracted pixels into pixels on the plane of an intersection, and may calculate a congestion level for each lane area or a lane area in each driving direction according to the number of resulting pixels included in each lane area or the lane area in each driving direction.

In greater detail, the input value of the artificial neural network used by the control unit 120 may be an intersection image, and the output value may be a map of the probability that each pixel corresponds to a vehicle. In addition, the control unit 120 may extract pixels constituting an object corresponding to a vehicle based on the map of the probability that each pixel corresponds to a vehicle, which is the output value of the artificial neural network. Accordingly, only the pixels of a portion corresponding to the object within the intersection image are extracted separately from other pixels, and the control unit 120 may determine the distribution of pixels in the lane area or the lane area in each driving direction. Thereafter, the control unit 120 may calculate a congestion level for each lane area or each driving direction according to the number of pixels in a preset area.

In this case, an available artificial neural network may be, for example, FCN, Deconvolutional Network, Dilated Convolution, DeepLab, or the like. Such an artificial neural network may be trained to generate a probability map by calculating a probability that each pixel included in an intersection image corresponds to a specific object, particularly a vehicle.

Thereafter, the control unit 120 may calculate control information for a subsequent phase by referring to the congestion level information and information about a signal pattern at a current point in time, i.e., information about a phase.

In this case, the phase is a signal pattern presented by the traffic lights S. For example, the phase refers to a combination of signals that appear simultaneously at traffic lights in east, west, north, and south directions. In general, a setting is made such that different phases appear sequentially.

In this case, the controller 120 may use a reinforcement learning model to generate control information based on congestion information and phase information.

FIG. 4 is a diagram showing a general reinforcement learning model, and FIG. 5 is a diagram illustrating the reinforcement learning and signal control process of a signal control apparatus according to an embodiment.

As shown in FIG. 4, the reinforcement learning model may include an agent and an environment. In this case, the agent may be generally configured to include a 'policy' constituted by an artificial neural network or a lookup table, and a 'reinforcement learning algorithm' configured to optimize the policy for determining an action $A_t$ by referring to state information and reward information given from the environment. In this case, the reinforcement learning algorithm improves the policy by referring to the state information $S_t$ obtained by observing the environment, the reward $R_t$ given when the state is improved in a desired direction, and the action $A_t$ output according to the policy.

In addition, this process is repeated at each step. In the following, a step corresponding to the present is indicated by t, a subsequent step is indicated by t+1, and so forth.

In one embodiment, the signal control apparatus 100 may be configured such that it has an intersection as an environment, has the congestion level of the intersection as state information, and sets a plurality of different phase patterns as actions, and a reward is provided when the congestion level is mitigated.

As shown in FIG. 5, the congestion level $C_t$ may be calculated from an image acquired by capturing an intersection according to the above-described method. In addition, using this, the state information $S_t$ may be constructed.

More specifically, the state information $S_t$ may be defined as follows:

$$S_t = [C_{t1}, C_t, \ldots, C_{tk}]$$

where $C_t$ is the congestion level, and k is the number of lane areas or driving directions set in advance.

In addition, the reward $R_t$ may be calculated based on the congestion level $C_t$, as follows.

First, a total current congestion level $L_t$ is calculated. The total congestion level may be calculated, as follows:

$$L_t = \sum_{i=1}^{k} C_{ti}$$

where $L_t$ is a total congestion level occurring in lanes or driving directions, k is the number of lanes or driving directions, and $C_{ti}$ is a current congestion level for each lane area or driving direction.

In addition, the reward $R_t$ is determined based on the total congestion level calculated as described above.

$$R_t = L_t - L_{t+1}$$

According to an embodiment, the reward $R_t$ is determined according to the above equation. Accordingly, when the congestion level is reduced at step t+1, the reward $R_t$ has a positive value, and thus a greater reward is given to the reinforcement learning model.

According to another embodiment, the reward $R_t$ may be determined according to the congestion levels at steps t and t−1. When the congestion level is reduced at step t than at step t−1, the reward $R_t$ has a positive value, and thus a greater reward is given to the reinforcement learning model.

In this case, the above-described reinforcement learning model may be configured to include a Q-network, or a DQN in which another artificial neural network is coupled to the Q-network. The policy $\pi$ is trained to select an action $A_t$ that optimizes the policy $\pi$ accordingly, i.e., that maximizes the expected value of a future reward accumulated at individual training steps.

In other words, the following function is defined:

$$Q^*(s_t, a_t) = \max_{\pi} IE[R_t + \gamma R_{t+1} + \gamma^2 R_{t+2} + \ldots | \pi]$$

In this case, in the state $s_t$, training is performed to derive the optimal Q function, i.e., Q*, for the action $a_t$. In addition, $\gamma$ is a discount factor, and is intended to allow an action $A_t$ increasing a current reward to be selected by incorporating a relatively small amount of a reward for a future step into the calculation of an expected value.

Additionally, in this case, the Q function is substantially configured in the form of a table, and thus it may be functionalized into a similar function having a new parameter using a function approximator.

$$Q(s, a; \theta) \approx Q^*(s, a)$$

In this case, a deep-learning artificial neural network may be used, and accordingly, the reinforcement learning model may be configured to include a DQN as described above.

The reinforcement learning model trained in this manner determines a subsequent signal as the action $A_t$ based on the state information $S_t$ and the reward $R_t$, and the determined subsequent signal is incorporated into the traffic lights S again to affect the environment, i.e., the congestion level of the intersection.

The above-described process is repeated and optimizes the policy of the reinforcement learning model.

Meanwhile, the diagram shown in FIG. 5 may be used not only when training the reinforcement learning model, but also when determining a subsequent signal using the already determined model. In this case, the reinforcement learning algorithm included in the reinforcement learning model is not used, and only the policy may be used. It is obvious that both learning and signal determination may be performed at the same time by continuously using the reinforcement learning algorithm.

More specifically, the control unit 120 may train the reinforcement learning model in advance before determining a subsequent signal using the policy of the reinforcement learning model and generating a control signal corresponding to the determined subsequent signal so that the traffic lights S can be controlled.

In this case, the control unit 120 may distinguish a learning target environment and a control target environment from each other. For example, after training the reinforcement learning model using a virtual or real learning target intersection, the control unit 120 may apply only the policy of the trained reinforcement learning model to the control target environment. In this case, the learning target environment and the control target environment may be the same environment, i.e., the same actual intersection.

Meanwhile, when the control unit 120 uses a virtual traffic simulation environment as the learning target environment, the traffic simulation environment may use, for example, the environment shown in FIG. 6. FIG. 6 is a diagram showing various set values and traffic patterns for constructing training data for a signal control apparatus according to an embodiment.

As shown in the upper part of FIG. 6, in order to construct the virtual environment, the speed of vehicles, the acceleration or deceleration performance of the vehicles, the length of a target lane for the calculation of a congestion level, the number of lanes, the length of the vehicles, the length of signals, etc. may be set in a simulator in a specific manner.

Additionally, in particular, in one embodiment, in order to construct the various environments of the intersection, the virtual environment may be implemented as being similar to a real one by constructing various traffic patterns P1, P2, P3, and P4 of the intersection and controlling the number of vehicles entering the intersection.

In addition, the control unit 120 may calculate a congestion level by receiving information about the location of each vehicle object at each step from the virtual traffic simulation environment, or may calculate a congestion level by analyzing an intersection image acquired from the traffic simulation environment.

Thereafter, the control unit 120 trains the reinforcement learning model based on the congestion level extracted from the traffic simulation environment as described above. In this case, the control unit 120 performs training according to a change in the environment under the control of the control unit 120 by applying a signal control signal back to the traffic simulation environment.

Meanwhile, the control unit 120 may perform the control of traffic lights to improve the congestion level of an actual traffic environment, i.e., an actual intersection, using the reinforcement learning model trained as described above. The signal control method by the control unit 120 will be described in greater detail below.

The signal control method to be described below includes steps that are performed in a time-series manner in the signal control apparatus 100 described with reference to FIGS. 1 to 6. Accordingly, the descriptions that are omitted below but are given above with reference to FIGS. 1 to 6 may also be applied to signal control methods according to the embodiments shown in FIGS. 7 to 10.

FIG. 7 is a flowchart showing the process of performing reinforcement learning in a signal control method according to an embodiment in a stepwise manner, FIG. 8 is a flowchart showing the process of controlling traffic lights using a reinforcement learning model in a signal control method according to an embodiment in a stepwise manner, and FIGS. 9 and 10 are flowcharts showing the process of calculating a congestion level in a signal control method according to an embodiment in a stepwise manner.

As shown in FIG. 7, the signal control apparatus 100 calculates state information and reward information based on the congestion level of an intersection at step 3710. The congestion level of the intersection may be the congestion level of a learning target intersection or the congestion level of an intersection that is the same as an actual control target.

In this case, the state information may be a vector value indicating a congestion level for each lane area or each driving direction at a current step as described above. The reward may be a value obtained by subtracting an immediately previous total congestion level for each lane area or each driving direction from a current total congestion level for each lane area or each driving direction.

In addition, the signal control apparatus 100 inputs the calculated state information and reward information to the agent of the reinforcement learning model at step 3720, and receives a subsequent phase, selected by the agent, as an output value and then generates control information at step S730. In addition, the signal control apparatus 100 controls the signal of the learning target intersection according to the control information at step S740.

In this case, the above-described steps S710 to S740 are repeatedly performed. In this process, an optimal Q function may be calculated.

Meanwhile, referring to FIG. 8, the process of controlling traffic lights using the reinforcement learning model trained by repeating steps S710 to S740 is now described. First, the signal control apparatus 100 may acquire an intersection image acquired by capturing an actual intersection at step S810.

In addition, the congestion level may be calculated by analyzing the intersection image at step S820. In this case, the congestion level may be calculated for each lane area or each driving direction.

In this case, the process of calculating a congestion level is briefly described with reference to FIGS. 9 and 10. According to an embodiment, the signal control apparatus 100 may recognize an object corresponding to a vehicle in an intersection image and acquire the location coordinates of each object at step S910. This step may be performed using an artificial neural network that performs detection as described above.

In addition, the signal control apparatus 100 may calculate congestion information for each lane area or each driving direction based on the distribution of the location coordinates of objects at step S920.

Meanwhile, as shown in FIG. 10, in another embodiment, the signal control apparatus 100 may extract pixels corresponding to each vehicle from an intersection image at step S1010, and may calculate congestion level information for each lane area or each driving direction based on the distribution of the extracted pixels at step 31020.

In this case, the signal control apparatus 100 may use an artificial neural network that performs segmentation.

Thereafter, again in FIG. 8, at step 3830, the signal control apparatus 100 may calculate current state information using the congestion level information calculated at step S820.

In addition, thereafter, the signal control apparatus 100 may calculate control information for a subsequent phase according to current state information and a phase at a current step at step 3840. In this case, at step S840, a reinforcement learning model trained through the steps of FIG. 7 may be used. At step S840, a subsequent phase may be calculated using only the policy part of an agent rather than the overall reinforcement learning model.

Thereafter, the signal control apparatus 100 may apply a drive signal to the traffic lights S according to the calculated control information.

It is obvious that in this case, the signal control apparatus 100 may additionally train the reinforcement learning model while performing the process shown in FIG. 8 as described above.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each of the functions provided in components and 'unit (s)' may be coupled to a smaller number of components and 'unit (s)' or divided into a larger number of components and 'unit (s)'.

In addition, components and 'unit(s)' may be implemented to run one or more CPUs in a device or secure multimedia card.

The signal control method according to the embodiment described with reference to FIGS. 7 to 10 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the signal control method according to the embodiment described with reference to FIGS. 7 to 10 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the signal control method according to the embodiment described with reference to FIGS. 7 to 10 may be implemented in such a manner that the above-described computer program is executed by a computing apparatus.

The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A signal control apparatus for controlling traffic signals based on reinforcement learning, the signal control apparatus comprising:
    a photographing unit configured to acquire an intersection image by capturing an image of an intersection;
    a control unit configured to calculate congestion level information of the intersection by analyzing the intersection image acquired by the photographing unit, and to calculate control information for a subsequent signal by using a reinforcement learning model, trained by using state information calculated based on a congestion level of the intersection and reward information as input values, and the congestion level information; and
    a drive unit configured to drive traffic lights according to the control information for a subsequent signal calculated by the control unit.

2. The signal control apparatus of claim 1, wherein the reinforcement learning model is trained to optimize a policy for selecting a subsequent signal in response to a current signal and current state information by repeating a process of receiving current state information generated based on congestion level information for each lane area or each driving direction of the intersection and reward information generated based on current congestion level information and immediately previous congestion level information and outputting the subsequent signal.

3. The signal control apparatus of claim 2, wherein:
    the reinforcement learning model is trained in advance before the control information to be transferred to the drive unit is calculated; and
    the control unit calculates the current state information based on the current congestion level information, and calculates the subsequent signal based on a combination of the current state information and the current signal by using the reinforcement learning model.

4. The signal control apparatus of claim 3, wherein the reinforcement learning model is trained using intersection images or congestion level information obtained from a traffic simulation environment configured according to preset variable values and traffic patterns.

5. The signal control apparatus of claim 2, wherein the control unit trains the reinforcement learning model by repeating a process of calculating current state information using current congestion level information acquired by analyzing the intersection image, calculating current reward information based on the current congestion level information and the immediately previous congestion level information, and transferring control information for a subsequent signal, output by inputting the current state information and the current reward information to the reinforcement learning model, to the drive unit.

6. The signal control apparatus of claim 1, wherein the control unit acquires location coordinates of each object by using an artificial neural network that receives the intersection image as an input, recognizes each object included in the intersection image and estimated to be a vehicle, and outputs information about a location of the recognized object, and calculates congestion level information for each lane area or each driving direction according to a distribution of acquired location coordinates of objects.

7. The signal control apparatus of claim 1, wherein the control unit extracts pixels corresponding to each vehicle by using an artificial neural network that receives the intersection image as an input and outputs a probability map indicating a probability that each pixel included in the intersection image corresponds to a vehicle, and calculates congestion level information for each lane area or each driving direction according to a distribution of extracted pixels.

8. The signal control apparatus of claim 1, wherein the reinforcement learning model is configured to include one of a Q-network and a DQN.

9. A signal control method that is performed by a signal control apparatus, the signal control method comprising:
    training a reinforcement learning model based on congestion levels of virtual or actual learning target intersections;
    acquiring an intersection image by capturing a control target intersection;

calculating congestion level information for each lane area or each driving direction by analyzing the intersection image;

calculating current state information of the control target intersection based on the congestion level information;

calculating control information for a subsequent signal according to the current state information and a current signal by using the reinforcement learning model; and driving traffic lights at the control target intersection according to the calculated control information.

10. The signal control method of claim 9, wherein training the reinforcement learning model comprises optimizing a policy for selecting a subsequent signal in response to a current signal and current state information by repeating a process of calculating state information and reward information based on congestion level information for each lane area or each driving direction of the learning target intersection, generating control information for the learning target intersection by using a subsequent signal output by inputting the calculated state information and reward information to the reinforcement learning model, and controlling traffic signals at the learning target intersection according to the generated control information.

11. The signal control method of claim 10, wherein:

the learning target intersection is a traffic simulation environment constructed according to preset variable values and traffic patterns; and the reinforcement learning model is trained by obtaining images or congestion level information of the learning target intersection from the traffic simulation environment.

12. The signal control method of claim 9, wherein training the reinforcement learning model is additionally performed each time obtaining the intersection image or driving the traffic lights is repeatedly performed.

13. The signal control method of claim 9, wherein training the reinforcement learning model comprises:

acquiring location coordinates of each object by using an artificial neural network that receives the intersection image as an input, recognizes each object included in the intersection image and estimated to be a vehicle, and outputs information about a location of the recognized object; and calculating congestion level information for each lane area or each driving direction according to a distribution of acquired location coordinates of objects.

14. The signal control method of claim 9, wherein calculating the congestion level information comprises:

extracting pixels corresponding to each vehicle by using an artificial neural network that receives the intersection image as an input and outputs a probability map indicating a probability that each pixel included in the intersection image corresponds to a vehicle; and calculating congestion level information for each lane area or each driving direction according to a distribution of extracted pixels.

15. A computer-readable storage medium having stored thereon a program for performing the method set forth in claim 9.

* * * * *